United States Patent [19]
Furuya et al.

[11] Patent Number: 5,272,447
[45] Date of Patent: Dec. 21, 1993

[54] DEMODULATOR AND DEMODULATION METHOD FOR A DIGITAL PHASE MODULATED SIGNAL

[75] Inventors: Yukitsuna Furuya, Tokyo; Soichi Tsumura, Osaka, both of Japan

[73] Assignee: NEC Corporation, Tokyo, Japan

[21] Appl. No.: 929,709

[22] Filed: Aug. 12, 1992

[30] Foreign Application Priority Data

Aug. 26, 1991 [JP] Japan ................................. 3-212534

[51] Int. Cl.[5] ........................................... H04L 27/22
[52] U.S. Cl. .................... 329/304; 329/306; 375/80; 375/83
[58] Field of Search ............... 329/304, 305, 306, 307, 329/308, 309, 310; 375/52, 55, 56, 80, 83

[56] References Cited
U.S. PATENT DOCUMENTS 4,746,872  5/1988  Yamagata ........................ 329/310 X

OTHER PUBLICATIONS

Hideho Tomita et al., Digital Intermediate Frequency Demodulation Technique for Cellular Communication Systems, IEEE Global Telecommunications Conference, Dec. 1990, pp. 1827–1831.

*Primary Examiner*—Siegfried H. Grimm
*Attorney, Agent, or Firm*—Whitham & Marhoefer

[57] ABSTRACT

A digital phase demodulator and digital phase demodulation method in delay detection form uses digital circuitry without a subtracter and with low power consumption. A phase measurement timing signal generator (11) outputs the phase measurement timing signal (103) produced by sampling a reception symbol cycle signal (101) by a reception signal (102) modulated to the logical level. A phase counter (31) outputs a synchronous clock signal (105) coinciding with a frequency of a reference clock (108) multiplied by n times the carrier frequency of the reception signal (102) so that the phase is synchronized with the phase measurement timing signal (103). The phase counter (14) counts the phase clock (105), and is reset by the phase measurement timing signal (103). The decoder (15) decodes a counted value (104) of the phase counter as a phase rotation quantity to the modulation data (107).

6 Claims, 6 Drawing Sheets

DEMODULATOR AND DEMODULATION METHOD FOR A DIGITAL PHASE MODULATED SIGNAL

BACKGROUND OF THE INVENTION

This invention relates to a demodulator and demodulation method to demodulate a delay detection by inputting a signal which is phase modulated by digital signal.

Under such a condition that a reception signal is strongly effected by fading as in a mobile communication system, it is known that a demodulation by delay detection results in an excellent error rate performance as a demodulation method for a reception signal which k phase (k is an integer more then 2) is modulated. In addition, there is a demodulation method, disclosed in laid open Japanese Patent Application No. 1-328824 (filing date: Dec. 18th in 1989) by the same applicant as this one, as the phase modulation method by the delay detection effective for miniaturization, ease of adjustment, and integration of device.

Hereafter, this invention is described by using the block diagram in FIG. 5 and the timing chart in FIG. 6. To the phase measurement timing generator 11, the reception symbol cycle signal 101 which rising time is corresponding to the point at when the reception signal symbol switches, and the reception signal 102 at an intermediate frequency (IF) that is converted to the logical level, the positive amplitude is "1" and the negative one "0", are externally input. The phase measurement timing generator 11 outputs a phase measurement timing signal 103 obtained by a sampling of the reception symbol cycle signal 101 at the rising (tr1, tr2, etc.) of the reception signal 102. Consequently, the rising of the phase measurement timing signal 103 coincides with that of the phase measurement timing signal 102. On the other hand, the phase counter 31 is operated by the phase counter operation clock 301 (externally input), with a frequency multiplied by n (n is a positive integer) of the IF carrier frequency of the reception signal 102, and the contents 302 of the phase counter 31 at the rising of the reception signal 102 indicates an instant relative phase of the reception signal 102. Therefore, the contents 302 of the phase counter 31 at the rising of the phase measurement timing signal 103 almost indicates the instant relative phase of every reception symbol cycle. The phase rotation quantity 304 between symbol cycles can be calculated by calculating the differences between the instant relative phase 302 at the current phase measurement timing and the instant relative phase 303 before one symbol cycle by the subtracter 33, with memorizing of the instant relative phase 303 before one reception symbol cycle by the latch 32. The reception data 107 is demodulated by decoding this phase rotation quantity 304 by the decoder 34.

In the demodulator structured as above, to demodulate the reception data, the differences between the instant relative phase at the current phase measurement timing and the instant relative phase before one reception symbol cycle must be calculated by the subtracter, but there was a problem that the construction of the circuit is complicated.

In addition, since the resolution of phase measurement is $2\pi/n$ when the phase counter is operated by the clock with the frequency multiplied by n (n is a positive integer) of the reception carrier frequency, for the original purpose to count a phase of the reception signal, it is sufficient if the frequency of clock operation of the phase counter is only multiplied by k of the reception carrier frequency when the reception signal is a phase modulation signal of k (k is an integer more than 2) phase. However, because the phase counter in the conventional demodulator is self-operating, the error 1 at worst is involved in the counted value of the phase counter. Because of this, this error must be relatively reduced by increasing the state number of phase counter that can be obtained at one cycle of reception carrier and breaking down the resolution of phase measurement as much as this error can be ignored.

To be concrete, when the number of sections of the phase counter is sufficient, there is no problem if the operating frequency of phase counter is made high enough with the reception carrier frequency. In other words, the resolution of phase measurement becomes high by lowering the reception carrier frequency and increasing the operating frequency of phase counter.

On the other hand, the phase measurement point should ideally be a timing of the reception symbol cycle signal, but it is made to wait until the rising or falling point of the reception carrier. Because of this, the measurement timing, at worst, is a time lag of one cycle of reception carrier compared with an ideal timing. Therefore, to raise the time accuracy of measurement timing, the ratio (reception carrier frequency/reception data frequency) between the reception carrier frequency and data frequency of reception signal (reception symbol frequency) must be increased, but the reception carrier frequency can not be lowered.

Thus, the operating frequency of the phase counter needs to be increased to raise the resolution of phase measurement of the demodulator, but there was a problem of excessive power consumption.

SUMMARY OF THE INVENTION

The demodulator of this invention is a demodulator for a digital phase modulated signal comprising:

means for outputting a phase measurement timing signal by sampling an externally inputted reception symbol cycle signal at either of rising or falling edges of an externally inputted logical level signal derived from a receiving signal;

means for outputting a synchronous clock signal having a same frequency as an externally inputted reference clock signal having a frequency n (n is a positive integer) times of a carrier frequency of said reception signal, rising or falling edges of said synchronous clock signal being synchronized with said rising or falling edges of said phase measurement timing signal;

a phase counter for counting said synchronous clock signal, said phase counter being reset upon either of said rising or falling edges of said phase measurement timing signal for turning around during each cycle of said reception signal; and means for generating a demodulated data by detecting phase rotation of reception symbol cycles based on a value of said phase counter at either of said rising or falling edges of said phase measurement timing signal.

The above synchronous clock generator preferably comprises:

means for generating m (m is a positive integer) delayed clock signals having different delay times by delaying said externally inputted reference clock signal;

means for selecting one delayed clock signal occurring at either of said rising or falling edges of said phase measurement timing signal, among said m delayed clock signals; and means for outputting said one delayed clock signal thus selected among said m delayed clock signals:

The above delay clock generator preferably obtains m delay clock signals by taking out respective outputs of said reference clock and m-1 delay elements, by placing the m-1 delay elements in series as a means of obtaining m (m is an integer) delay clock signals.

The above transition clock detector preferably detects the delay clock signal when the phase is reversed as the delay clock signal occurs at either of rising or falling of said phase measurement timing signal by looking into the phases of said m delay clock signals in order at either of rising or falling of said phase measurement timing signal.

The above phase counter preferably uses the delay clock signal output by said clock selector to be reset at either of rising or falling of said phase measurement timing signal and have an edge infinitely equal to that of said phase measurement timing signal as that operation clock.

And the demodulation method by this invention first outputs the phase measurement timing signal gained by sampling the reception symbol cycle signal having a rising time corresponding to the time at which the reception signal symbol is switched at the rising of the reception signal having logical level which is converted from the positive amplitude "1" to the negative amplitude "0".

It then outputs the synchronous clock signal having the same frequency as the inputted reference clock signal having the frequency multiplied by n (n is positive integer) times of the carrier frequency of said reception signal, and having a rising or falling edge corresponding to either of the rising or falling of said phase measurement timing signal.

It also counts said synchronous clock signal by the phase counter to be reset at either of the rising or falling of said phase measurement timing signal, and demodulates as demodulation data the measured quantity of the phase rotation between reception symbol cycles of said reception signal by the counted value of said phase counter at either of the rising or falling of said phase measurement timing signal.

In this invention, the same operation as with the conventional calculation of differences by a subtracter can be realized without a subtracter, because the contents of phase counter at the next measurement point directly indicates a phase rotation quantity in one reception symbol cycle by resetting the phase counter with the phase measurement timing signal obtained by sampling at either of the rising or falling of the reception signal so that the reception symbol synchronous signal was converted to the logical level.

And a phase count error does not occur if clearing the phase counter error. Therefore, because it is sufficient if the frequency of the operation clock of phase counter is only multiplied by k for the phase modulation signal of k phase, it becomes possible to demodulate by using the phase counter with an operation frequency lower than usual, and results in an advantageous demodulator without excessive power consumption.

DESCRIPTION OF THE REFERENCE NUMERALS

11—Phase Measurement Timing Signal Generator
13—Synchronous Clock Generator
14—Phase Counter
15—Decoder
101—Reception Symbol Cycle Signal
102—Reception Signal
103—Phase Measurement Timing Signal
104—Contents of Phase Counter
105—Synchronous Clock
107—Reception Data
108—Reference Clock
21—Delay Clock Generator
22—Transition Clock Detector
23—Clock Selector
201—Delay Clock Signal
202—Clock Selection Signal
31—Phase Counter
32—Latch
33—Subtracter Decoder
301—Phase Counter Operation Clock
302—Current Instant Relative Phase
303—Instant Relative Phase before One Symbol Cycle
304—Phase Rotation Quantity between One Symbol Cycle

DESCRIPTION OF THE EMBODIMENT OF THE INVENTION

The following describes the invention with reference to the figures.

Figure 1:
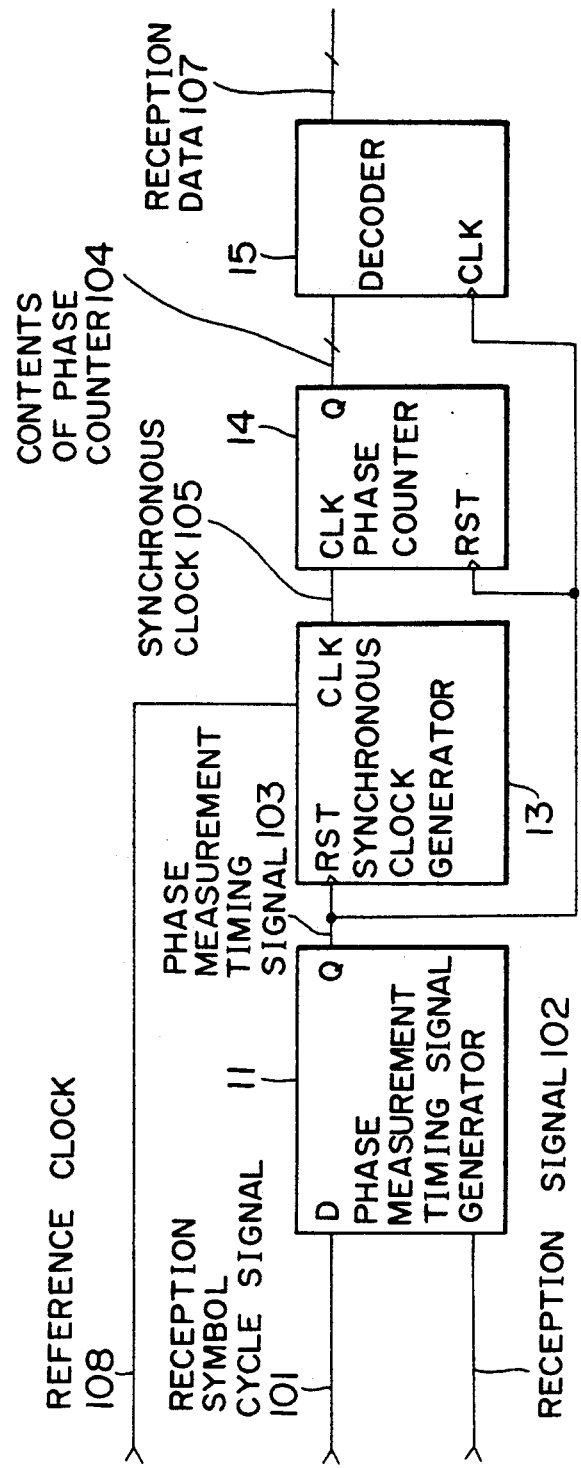
FIG. 1 is a block diagram of a demodulator according to a preferred embodiment of this invention.
Figure 2:
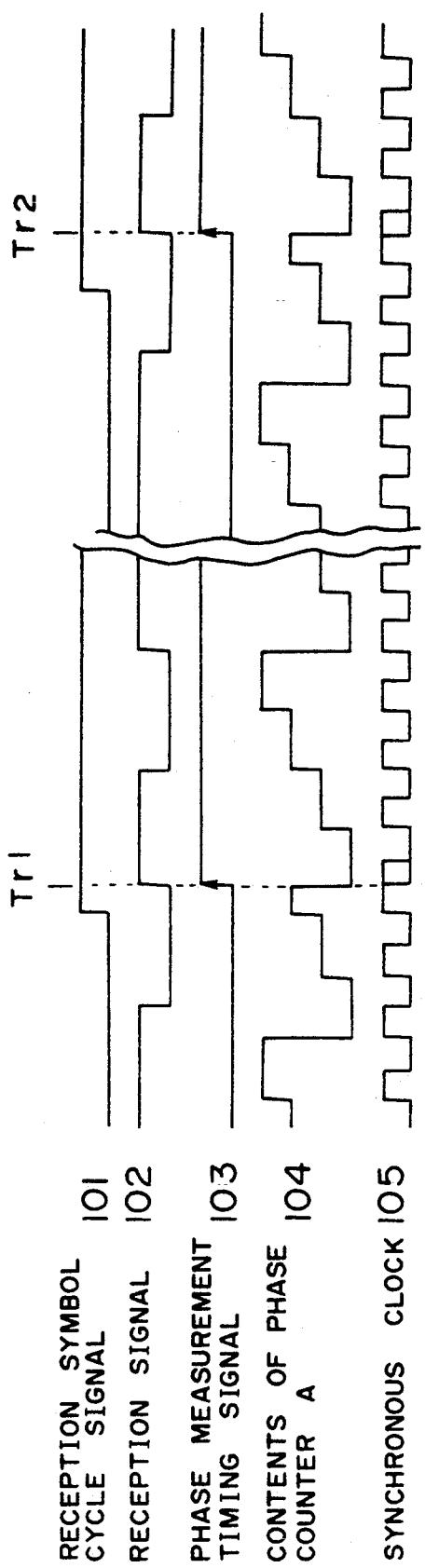
FIG. 2 is a timing chart of the embodiment shown in FIG. 1.

FIG. 1 is the block diagram of a preferred embodiment of the invention, and FIG. 2 is the timing chart.

To the phase measurement timing generator 11, the reception symbol cycle signal 101 with a rising point corresponding to the switching point of the reception signal symbol, and the reception signal 102 converted to the logical level, the positive amplitude is "1" and the negative one "0" are externally input. The phase measurement timing generator 11 will output the phase measurement timing signal 103 obtained by a sampling of the reception symbol cycle signal 101 at the rising of the reception signal 102 (tr1, tr2, etc.). By this the rising point of the phase measurement timing signal 103 corresponds to that of the phase signal 102.

The synchronous clock generator 13 outputs the synchronous clock 105 with the same frequency as the reference clock 108, that has the rising edge corresponding to that of the phase measurement timing signal 103 by inputting an external reference clock signal 108 with the frequency multiplied by n (n is positive integer) of the carrier frequency of the reception signal 102 and the phase measurement timing signal 103.

The phase counter 14 operates by counting at the rising of the synchronous clock 105, and also the counting value is set at the rising of the phase measurement timing signal 103. Therefore the contents 104 of the phase counter 14 at the rising of the reception signal 102 indicates the current reception signal phase when the reception signal phase in the phase measurement timing is "0". Therefore the contents 104 of the phase counter 14 at the phase measurement timing indicates the phase rotation quantity by the one symbol time.

And the synchronous clock 105, that is the operation clock of the phase counter 14, has risen at the rising (tr1, tr2, etc.) of the phase measurement timing signal 103. Because the frequency of the synchronous clock 105 is multiplied by n, the counted value of the phase counter 14 (having been reset at the rising of the phase measurement timing signal 103) is always equal to the positive integral multiple of 1/n of the reception signal cycle, and there is no error in the counted value of the phase counter 14.

With the above, the received data will be demodulated by decoding the phase rotation quantity in one symbol time obtained from the phase counter 104 by the decoder 15.

Moreover, there is no problem if the sampling of the reception symbol cycle signal 101 at the phase measurement timing signal generator is done at the rising of the signal 102.

Figure 3:
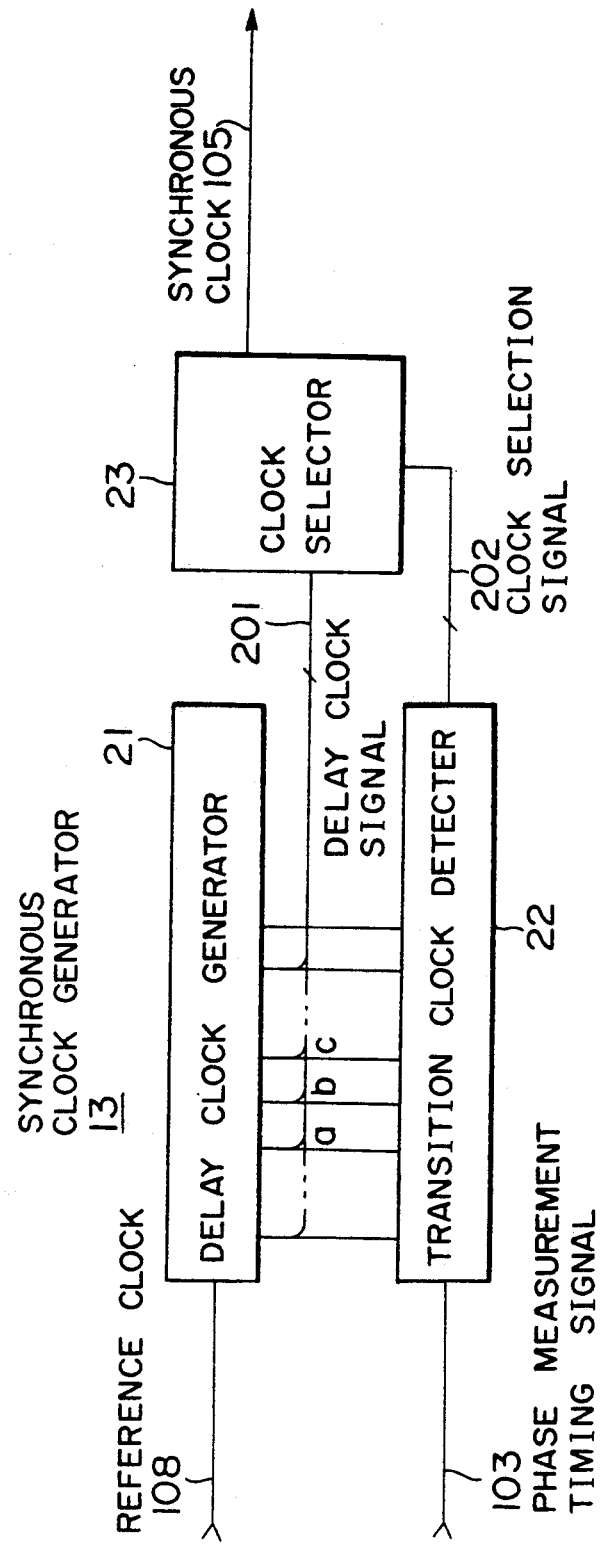
FIG. 3 is a block diagram of the synchronous clock generator of the embodiment shown in FIG. 1.
Figure 4:
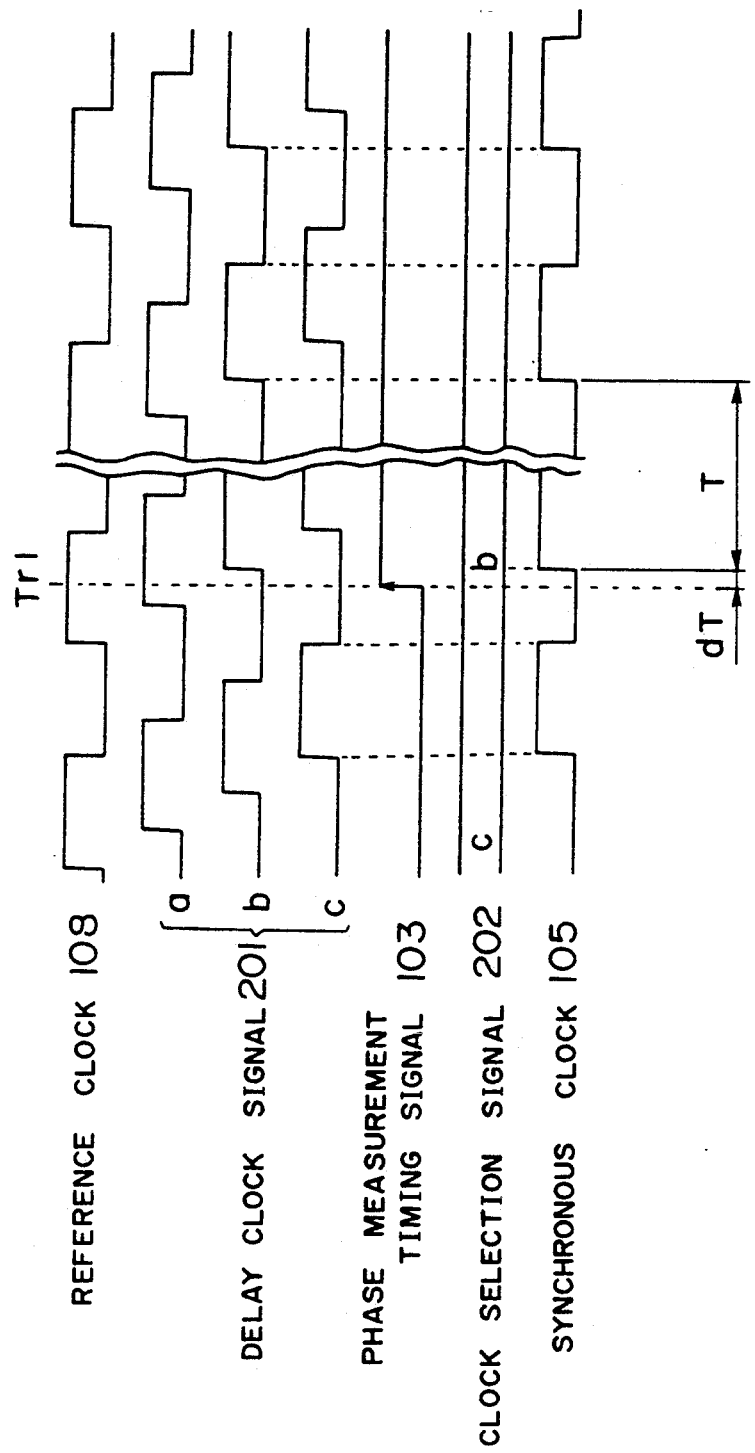
FIG. 4 is a timing chart of the synchronous clock generator in FIG. 3.
Figure 5:
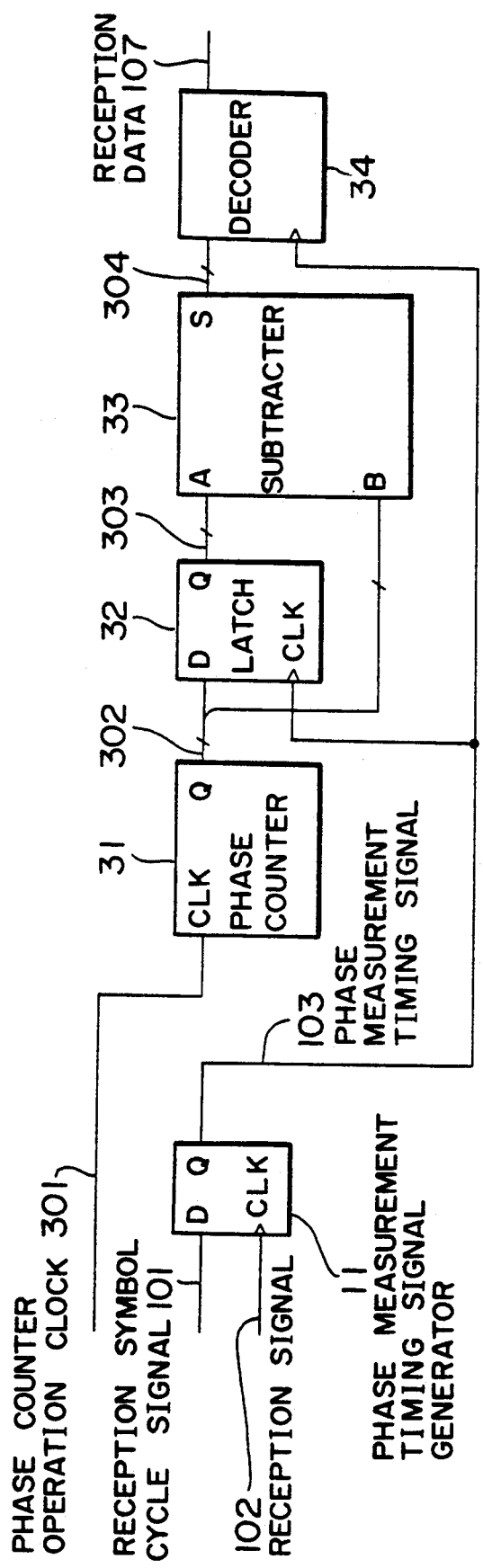
FIG. 5 is a block diagram of a conventional demodulator.
Figure 6:
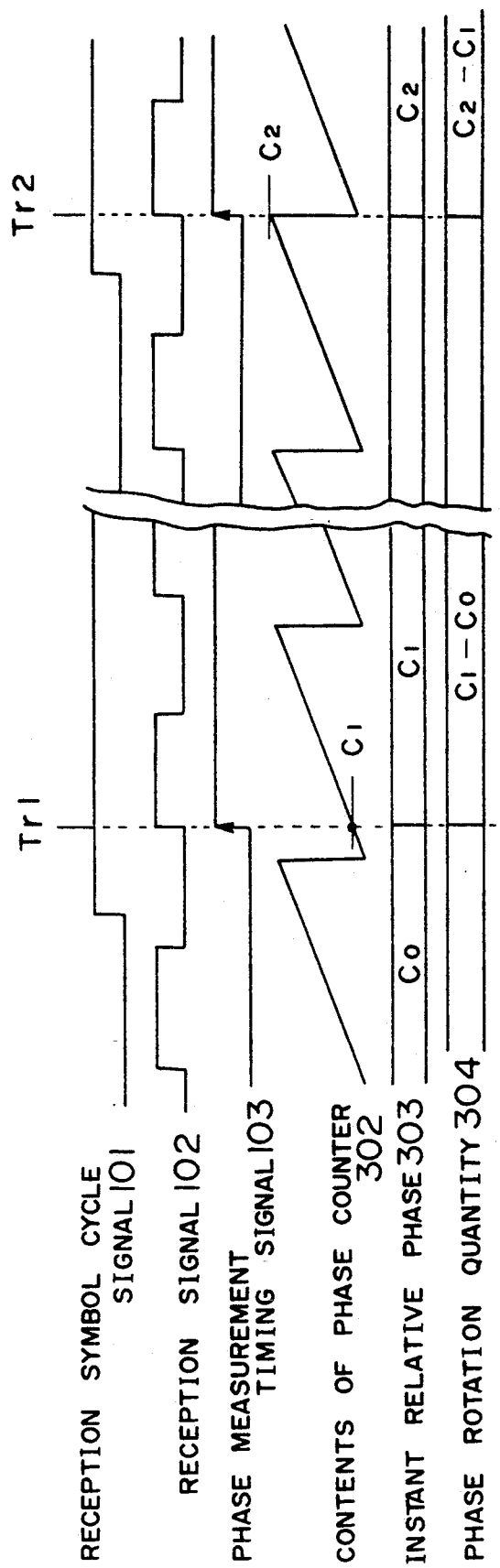
FIG. 6 is a timing chart of the demodulator in FIG. 5.

FIG. 3 is the block diagram of an example of synchronous clock generator 13 of the demodulator in FIG. 1 and the FIG. 4 is this timing chart diagram.

The delay clock generator 21 of the synchronous clock generator 13 obtains m (m is a positive integer) delay clock signals 201 delayed more than one cycle with respect to the reference clock 108; that is, the largest delayed quantity among delayed quantities is differentiated from each other with the reference clock 108 by externally inputting the reference clock 108. This, for instance, is realized by aligning the m-1 delayed components in series, so that the total of m-1 delayed quantity becomes more than one cycle of the reference clock 108, and suppressing the reference clock 108 and each output of m-1 delayed components. The transition clock detector 22 detects the delay clock 201b in FIG. 4, occurring at the rising tr1 of the phase measurement timing signal 103, among m delay clock signals 201, and outputs the clock selection signal 202 to indicate that the delay clock 201b was detected. The method of detecting the delay clock 201b is to select the delay clock signal when the phase is reversed of one of the m delay clock signals 201 after the rising, tr1, of the phase measurement timing 103. The clock selector 23 selects one delay clock 201b among the m delay clock signals 201 by this clock selection signal 202, and outputs this as the synchronous clock 105.

The synchronous error dT of the synchronous clock 105 of synchronous clock generator 13 generated in this way can be made extremely small because it becomes the error of the delay quantity of m delay clock signals generated by the delay clock generator 21.

As described above, by the invention the phase rotation quantity in one reception symbol cycle can be calculated without using the subtracter to reset the phase counter every time at the phase measurement timing, and there is an effect that the circuit construction becomes simpler.

In addition, even if the resolution of phase measurement is reduced by causing the edge of the operation clock of the phase counter to coincide with the edge of the phase measurement timing signal, a demodulation error does not occur. As a result, the operation clock of the phase counter can be lowered, and excessive power consumption is avoided.

We claim:

1. A demodulator for a digital phase modulated signal comprising:

means for outputting a phase measurement timing signal by sampling an externally inputted reception symbol cycle signal with an externally inputted logical level signal derived from a reception signal;

means for outputting a synchronous clock signal having a same frequency as an externally inputted reference clock signal having a frequency n (n is a positive integer) times a carrier frequency of said reception signal, said synchronous clock signal being synchronized with said phase measurement timing signal;

a phase counter for counting said synchronous clock signal, said phase counter being reset by said phase measurement timing signal during each cycle of said reception signal; and means for generating a demodulated data by detecting phase rotation of reception symbol cycles based on a value of said phase counter at a time determined by said phase measurement timing signal.

2. A demodulator, as set forth in claim 1, wherein said synchronous clock signal outputting means comprises:

means for generating m (m is a positive integer) delayed clock signals having different delay times by delaying said externally inputted reference clock signal;

means for selecting one delayed clock signal among said m delayed clock signals in response to said phase measurement timing signal; and means for outputting said one delayed clock signal thus selected among said m delayed clock signals.

3. A demodulator, as set forth in claim 2, wherein said delayed clock signal generation means comprises a plurality of delay elements connected in series, said delay elements outputting said m delayed clock signals.

4. A demodulator, as set forth in claim 2, wherein said selecting means comprises means for detecting a delayed clock signal at phase reversal of a delayed clock signal in synchronism with said phase measurement timing signal by checking phases of the m delayed clock signals in order.

5. A demodulator, as set forth in claim 2, wherein said phase counter is responsive to a delayed clock signal output from said selecting means and is reset by the phase measurement signal.

6. A method of demodulating a digital phase modulated signal comprising steps of:

outputting a phase measurement timing signal by sampling an externally inputted reception symbol cycle signal with an externally inputted logical level signal derived from a reception signal;

outputting a synchronous clock signal having a same frequency as an externally inputted reference clock signal having a frequency n (n is a positive integer) times a carrier frequency of said reception signal and synchronized with said phase measurement timing signal;

counting said synchronous clock signal, said counting being reset by said phase measurement timing signal for repeating said counting during each cycle of said reception signal; and generating a demodulated data by detecting phase rotation of reception symbol cycles based on a value of said phase counter at times determined by said phase measurement timing signal.

* * * * *